United States Patent [19]

Wilde et al.

[11] 4,418,828
[45] Dec. 6, 1983

[54] PLASTIC CLOSURE WITH MECHANICAL PILFER BAND

[75] Inventors: Sheldon L. Wilde; Thomas J. McCandless, both of Crawfordsville, Ind.

[73] Assignee: H-C Industries, Inc., Crawfordsville, Ind.

[21] Appl. No.: 286,375

[22] Filed: Jul. 24, 1981

[51] Int. Cl.³ .............................................. B65D 41/34
[52] U.S. Cl. .................................................. 215/252
[58] Field of Search ................................ 215/252, 253

[56] References Cited

U.S. PATENT DOCUMENTS

| | | | |
|---|---|---|---|
| 2,423,582 | 7/1947 | Coleman | 215/252 |
| 3,249,247 | 5/1966 | Babiol | 215/252 |
| 3,441,161 | 4/1969 | Van Baarn | 215/252 X |
| 3,504,818 | 4/1970 | Crisci et al. | 215/252 |
| 3,929,246 | 12/1975 | Leitz | 215/252 |
| 4,033,472 | 7/1977 | Aichinger | 215/256 |
| 4,196,818 | 4/1980 | Brownbill | 215/252 |
| 4,299,328 | 11/1981 | Ochs et al. | 215/252 |
| 4,305,516 | 12/1981 | Perne et al. | 215/252 |
| 4,305,517 | 12/1981 | Dennis | 215/256 |
| 4,322,009 | 3/1982 | Mumford | 215/253 |

FOREIGN PATENT DOCUMENTS

| | | |
|---|---|---|
| 81290 | 2/1980 | European Pat. Off. |
| 2290364 | 4/1976 | France . |
| 2339541 | 8/1977 | France . |
| 56-74445 | 6/1981 | Japan . |
| 1052734 | 12/1966 | United Kingdom . |
| 1297624 | 11/1972 | United Kingdom . |
| 1361180 | 7/1974 | United Kingdom . |
| 1384370 | 2/1975 | United Kingdom . |
| 2068912 | 8/1981 | United Kingdom . |

*Primary Examiner*—Donald F. Norton
*Attorney, Agent, or Firm*—Dressler, Goldsmith, Shore, Sutker & Milnamow, Ltd.

[57] ABSTRACT

A novel plastic closure is disclosed having a self-engaging locking pilfer band arrangement for engagement with a locking ring on the neck of the container to which the closure is applied. The pilfer band includes a plurality of circumferentially spaced, inwardly extending relatively thin flexible wings or fingers which move to an out-of-the-way position during application of the closure to the container. When the closure is in place on the container, the wings are disposed such that they engage the surface of the locking ring on the container neck when the closure is moved for removal from the container. During removal, each wing engages the locking ring so that resistance to removal of the closure is created in the pilfer band, whereby areas of reduced strength fracture clearly indicating partial or complete removal of the closure from the container.

57 Claims, 16 Drawing Figures

PLASTIC CLOSURE WITH MECHANICAL PILFER BAND

TECHNICAL FIELD OF THE INVENTION

The present invention relates generally to plastic closures for bottles and other like containers, and more particularly to an improved plastic closure having an integral self-engaging pilfer band.

BACKGROUND OF THE INVENTION

A wide variety of closures are known for closing and sealing bottles and other like containers. One type of closure is typically provided with internal threads on its side wall portion which are adapted to engage external threads on the neck of the container for retention of the closure on the container. Rotation of the closure with respect to the container results in the closure moving axially of the bottle neck so that the closure may be removed and the container opened. Other types of closures include arrangements for interlocking with the necks of the containers to which they are applied with little or no relative rotation by way of a snap fitting or the like.

One desirable feature for closures of the above descriptions is a provision for indicating whether the container has been previously opened by removal of the closure therefrom. To this end, various arrangements for so-called pilfer bands are known. These arrangements are sometimes referred to as tamper bands, guarantee bands, or security rings. Frequently, a peripherally extending annular locking ring or other arrangement is provided on the neck of the container for interaction with the pilfer band of the closure for indication of closure tampering.

For a closure made from plastic material, it is desirable that the pilfer band be formed integrally with the shell or cap portion of the closure. When the closure is applied to a container, the integral pilfer band portion of the closure is typically brought into association with the annular locking ring or other arrangement provided on the neck of the container so that the pilfer band operatively interacts therewith for indicating whether the closure has been removed from the container.

Because the application of closures to containers is preferably performed on a high speed production line, it is desirable that application be possible with the fewest number of production steps. Heretofore, the pilfer band arrangement for some plastic closures has required one or more specific production processes for properly associating the pilfer band arrangement with the locking ring or other retaining means provided on the neck of the container.

For instance, U.S. Pat. No. 3,673,671, issued to Lietz, illustrates a method of applying pilfer-proof closures wherein a security ring provided on a plastic closure is deformed by heat and pressure to roll it onto an undercut portion of the neck of the container. Similarly, U.S. Pat. No. 4,033,472, to Aichinger, illustrates a closure for containers having a downwardly depending band of heat deformable thermoplastic which is heat deformed so as to engage with a bead provided on the container neck.

Another type of heat-deformable pilfer band arrangement is illustrated in British Pat. No. 1,384,370, issued to Behringer, et al. This patent teaches a closure with an integral heat-shrinkable pilfer-band comprising resilient memory plastic which is flared outwardly for application of the closure to a container, and is then heated, in a heat tunnel for example, whereby the resilient memory of the band causes it to "shrink" and deform so as to engage an annular locking ring on the container rack.

Clearly, the drawbacks of plastic closures of this type will be readily appreciated in that not only does the application of these types of closures require additional production steps in a high speed bottling operation, but additionally mandate that the bottler or other packager provide the requisite specialized machinery for application of the closures in the prescribed fashion.

Thus, the development of an effective, self-engaging pilfer band for a plastic closure which would be suitable for application to bottles or other like containers without the use of specialized production equipment would significantly enhance the desirability of plastic closures for use in a high speed bottling operation.

SUMMARY OF THE INVENTION

In accordance with the present invention, a molded plastic closure having an integral pilfer band for a bottle or like container is disclosed. In the preferred embodiment, the closure is adapted for use on a container having a threaded neck portion which includes a peripherally extending annular bead portion or locking ring, although the closure may be readily adapted for use on containers having non-threaded neck portions.

The closure includes a cap having a top wall portion, and a cylindrical, preferably threaded skirt portion depending from the top wall portion integrally formed therewith.

The closure of the present invention further includes a pilfer band integral with and depending from the skirt portion of the cap. In the preferred embodiment, the pilfer band is distinguished from the skirt portion of the cap by a fracturable area which comprises a peripheral weakened skirt portion. The fracturable area preferably comprises scoring of the closure so that the pilfer band is detachably connected to the cap of the closure by frangible bridges. Depending upon the desired result during removal, the fracturable area may be provided so that the pilfer band is completely severed from the cap of the closure, and thus remains on the container after the cap is removed. Alternately, the pilfer band may be provided with an area of reduced strength and joined to the skirt portion of the cap by an integral connector portion whereby the pilfer band is severable and removable from the container together with the cap.

The closure may be of the so-called composite type, and include a liner portion of plastic material disposed adjacent the top wall portion of the cap which is adapted to sealingly engage the mouth of the container for effectively sealing the contents therein. It will be understood, however, that the pilfer band arrangement of the present invention would be equally suited for use on non-composite plastic closures. Alternate embodiments of the invention illustrate closures of the so-called plug seal type which include sealing arrangements for sealing against the inner diameter or surface of the container mouth.

In accordance with the present invention, the pilfer band of the closure includes a novel arrangement for effecting locking engagement with the neck of the container which is essentially self-engaging. The pilfer band includes engagement means which are adapted to engage a portion of the neck of the container after the closure is applied to the container.

The engagement means of the pilfer band comprise a plurality of relatively thin, flexible fingers or wings which extend integrally inwardly of an annular band portion of the pilfer band. The wings are spaced circumferentially of the closure, and their free or inner edge portions generally define a circle having a diameter less than the annular locking ring of the container neck. Preferably, each wing extends inwardly from the band portion of the pilfer band at an angle, and each is disposed at an angle with respect to the axis of rotation of the closure.

In an embodiment of the present invention wherein the closure is rotatably applied to the container, the wings of the pilfer band engage the container neck such that when the closure is rotated for removal from the container, the pilfer band resists rotation and thus fractures the fracturable area of the weakened skirt portion. In another embodiment, where the closure is applied to the container with little or no relative rotation, the wings cam against the container neck urging the pilfer band outwardly of the container so that areas of reduced strength on the band fracture for indicating removal.

In the preferred embodiment of the closure, mechanically locking interaction of the wings of the pilfer-band with the container neck is provided in a novel fashion relating to the angular disposition, resilient flexibility, and dimensions of the wings. Specifically, each of the wings includes a camming edge portion which is adapted to engage and cam against the locking ring of the container neck when the closure is rotated for removal from the container. Preferably, the camming edge portion of each wing is generally complemental to the locking ring of the container neck.

Rotation of the closure for removal from the container results in axial displacement of the closure relative to the container neck causing a camming action between the locking ring and the wings of the pilfer band which urges the wings to bend or flex about their edges integral with the band portion of the pilfer band. However, the preferred embodiment of the present pilfer band arrangement provides that the wings are dimensioned such that there is a lack of clearance between the container neck and the annular band portion inwardly of which the wings extend. Thus, the tip or free end portion of each wing is urged into locking engagement with a portion of the container neck disposed adjacent and below the locking ring of the neck. The result of this interaction is an interference-like locking action taking place as each wing is urged into engagement with the container neck as the camming edge portion of each wing is urged against the locking ring of the container neck.

As the closure is rotated for removal from the container, the above locking interaction of the pilfer band with the container neck resists the torque applied to the closure, and thus creates shear forces within the closure. When these shear forces reach a magnitude which is sufficiently great, the peripheral weakened skirt portion of the closure fractures, thus providing a clear indication that the closure has been removed, or partially removed, from the container.

Depending upon the requirements of a specific user, the pilfer band itself of the closure may be provided with an area of reduced strength, such as a vertical score, so that the pilfer band is severed and thus removable from the container. Preferably, a connector portion of relatively great strength is also provided, and integrally connects the pilfer band with the cap of the closure so that the pilfer band is removed from the container together with the cap. Alternatively, the fracturable weakened skirt portion of the closure may be provided such that after the area fractures, the pilfer band is completely severed and detached from the cap of the closure so that the cap may be removed while the pilfer band remains on the container.

In other embodiments of the present invention, the wings of the pilfer band extend inwardly of the band portion of the pilfer band and are adapted to essentially engage the locking ring only of the container neck so the pilfer band resists removal of the closure, with engagement of the free edge portion of each wing with the portion of the container neck adjacent the locking ring being unnecessary.

In one embodiment, where the closure is rotatably applied to and removed from the container, the frictional engagement of the wings with the surface of the locking ring and the resiliency of each wing are sufficient to create resistance to rotation which results in fracture of the pilfer band from the skirt portion of the closure. When frictional engagement is not sufficient to create the desired rotation resistance, serrations or other surface irregularities may be provided on the locking ring for enhancing engagement with the wings of the closure pilfer band.

A further embodiment of the present invention comprises a closure where the pilfer band remains integrally connected with the closure skirt portion after removal from the container. In this embodiment, the closure pilfer band includes one or more areas of reduced strength, such as vertical scores. Indication of opening of the container is provided by the wings on the closure pilfer band in accordance with the present invention.

In this embodiment, movement of the closure axially of the container neck for removal urges the wings into engagement with a locking ring or other suitable surface on the container neck, whereby the wings are urged and cammed outwardly and away from the container, thereby tensioning and stressing the pilfer band so that the areas of reduced strength fracture. The wings may then clear the container neck so that the pilfer band is removed from the container with the cap of the closure, the fracturable nature of the pilfer band providing a clear indication of opening. Significantly, this embodiment of the invention provides this indication as a result of relative axial movement of the closure and container, and is thus suited for containers where the closure is threaded off, or where the closure is removed from the container with limited or no relative rotation.

As noted above, one significant feature of the present invention is the self-engaging nature of the pilfer band arrangement for providing locking engagement of the pilfer band with the locking ring provided on the container neck. This feature is facilitated by the action of the wings of the pilfer band during application of the closure to a container. Because of the relatively flexible nature of each of the wings, application of the closure to a container results in the wings engaging the container neck and bending or flexing outwardly of the container so that the closure may be properly and efficiently put in place. Preferably, each wing is disposed angularly with respect to the band portion of the pilfer band so that flexing to an out-of-the-way position is accommodated.

During application to a container having a locking ring or other suitable surface on the container neck for engaging the wings of the closure pilfer band, each wing engages and cams out of the way of the locking ring of the container neck until the cap of the closure sealingly engages the container mouth. The wings of the pilfer band are adapted to move past the locking ring, and then are disposed adjacent to and below the locking ring of the neck. The resilience of the wings causes them to again resume their original inwardly directed disposition, with each wing engagable with the locking ring. Significantly, the lateral flexibility of the wings results in much less stretching of the pilfer band during application of the closure than with arrangements heretofore known. Consequently, there is relatively less stress put upon the fracturable skirt portion of the closure during application. In the preferred embodiment, the free end locking portion of each wing engages that portion of the container neck disposed below the locking ring, while in other embodiments engagement of the free end portion of each wing with this portion of the container neck is unnecessary.

Thus, a plastic closure in accordance with the present invention provides a novel self-engaging pilfer band arrangement which is highly effective for indication of tampering or opening of the container, but which avoids the need for specialized equipment and/or production line processes for effectively providing the desired interaction between the pilfer band arrangement and the container neck.

DETAILED DESCRIPTION

Figure 1:
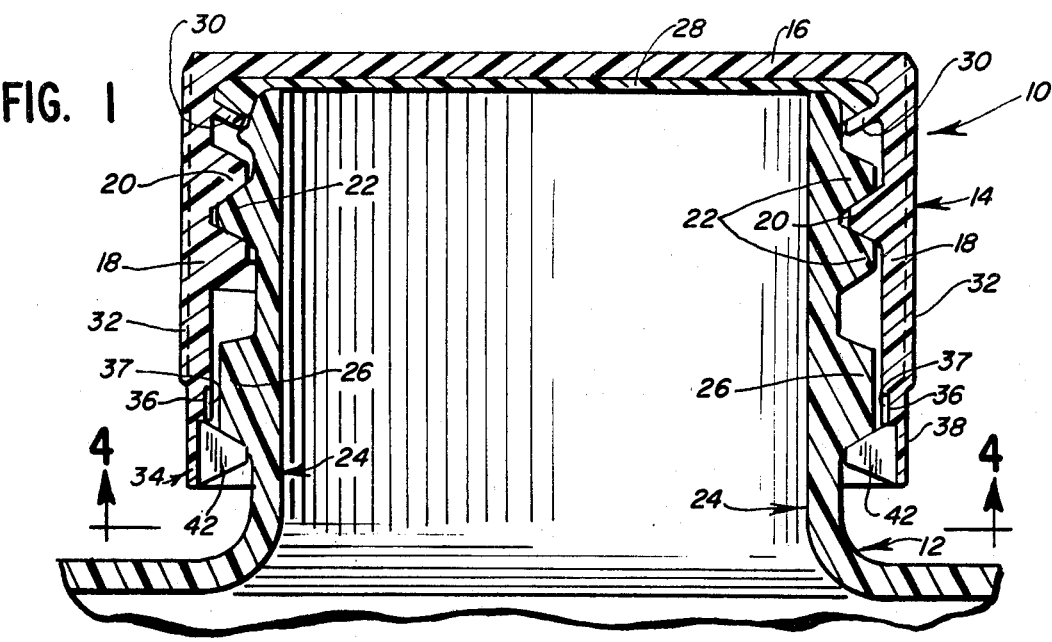
FIG. 1 is a cross-sectional elevational view of a plastic closure in accordance with the present invention applied to a bottle or like container.

While the present invention is susceptible of embodiment in different forms, there is shown in the drawings and will hereinafter be described a presently preferred embodiment and alternate embodiments with the understanding that the present disclosure is to be considered as an exemplification of the invention and is not intended to limit the invention to the specific embodiments illustrated.

With reference now to FIG. 1, therein is illustrated a molded plastic closure 10 in accordance with the preferred embodiment of the present invention. Closure 10 is shown applied to a bottle or like container 12. Closure 10 may be fabricated from any of a variety of plastic materials, such as polypropylene or polyethylene.

Closure 10 includes a cap 14 (sometimes referred to as a shell) which includes a generally circular top wall portion 16 and a generally cylindrical skirt portion 18 depending from and integral with top wall portion 16. Skirt portion 18 includes internal threads 20 which are adapted to mate with and engage external container neck threads 22 which are formed integrally with container neck 24. Additionally, container neck 24 includes a peripherally extending, continuous annular bead portion or locking ring 26 disposed beneath neck threads 22.

As shown, plastic closure 10 includes a plastic liner 28 positioned adjacent to top wall portion 16. Cap 14 includes an annular liner-retaining lip 30 which extends inwardly of the cap and aids in retention of plastic liner 28. As shown in FIG. 1, plastic liner 28 is adapted to be brought into and maintained in sealing engagement with the side of the mouth of the container defined by the top of container neck 24. It will be appreciated, however, that a closure in accordance with the present invention may be provided with a sealing arrangement other than side sealing liner 28 shown.

Skirt portion 18 of cap 14 includes a plurality of circumferentially spaced, vertically extending external ribs 32 which facilitate gripping of closure 10 by mechanical bottling machinery, or by a consumer for removing the closure from the container with their hands.

Figure 2:
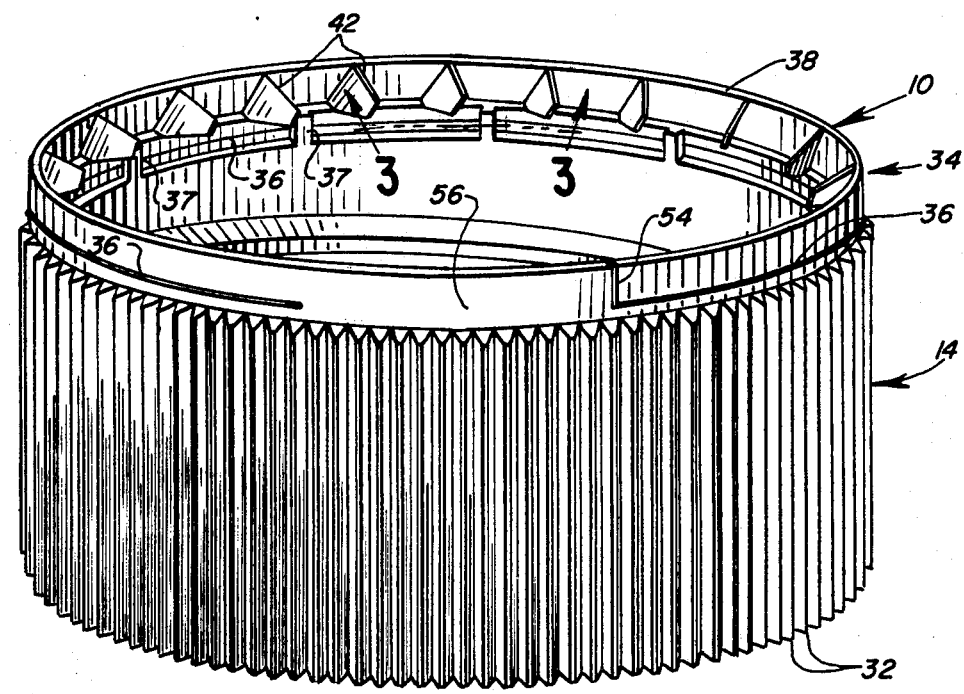
FIG. 2 is a perspective view looking into the plastic closure of FIG. 1.

In accordance with the present invention, an integral pilfer band 34 is provided adjacent to skirt portion 18, as shown in FIGS. 1 and 2. Pilfer band 34 preferably is formed integrally with the closure 10 during its formation, and extends continuously about the closure and defines the lower edge thereof.

Pilfer band 34 is distinguished from skirt portion 18 of cap 14 by a peripheral, fracturable weakened skirt portion. Preferably, this weakened skirt portion comprises a plurality of circumferentially spaced, integrally molded frangible bridges or ribs 37 which extend between the inside surfaces of pilfer band 34 and skirt portion 18. The fracturable skirt portion further comprises a score line 36 which extends peripherally of the closure for creating an area of reduced strength between pilfer band 34 and skirt portion 18. Score line 36 is preferably formed so that pilfer band 34 is substantially severed and detached from skirt portion 18 except for frangible ribs 37. Depending upon the desired strength of each rib 37, the cutting edge used to form score line 36 may also be used to simultaneously score or partially cut some or all of ribs 37 depending upon the desired strength of the ribs.

Ribs 37 provide an integral connection between pilfer band 34 and skirt portion 18 which is sufficiently strong to accommodate application of closure 10 to container 12 without failure. However, during rotation for removal of the closure from the container, pilfer band 34 resists the rotation and thus shear forces are created from the torque which act to cause ribs 37 to fail and fracture. Where score line 36 is provided substantially about the entire periphery of closure 10 and all of ribs 37 fracture, pilfer band 34 is effectively detachably connected to cap 14 of the closure, and thus fracturing of the weakened skirt area indicates partial or complete removal of the closure from container 12. Additionally, the detachable connection causes pilfer band 34 to remain on container 12 after cap 14 is removed therefrom.

Figure 8:
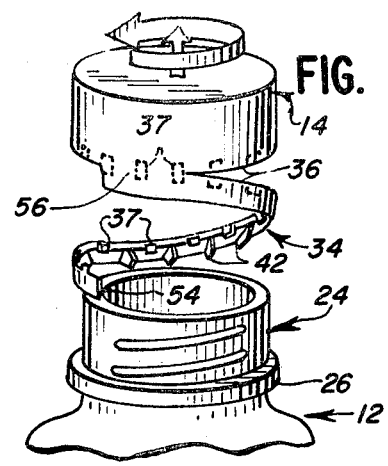
FIG. 8 is a perspective view illustrating removal of the closure illustrated in FIG. 1 from a container.
Figure 9:
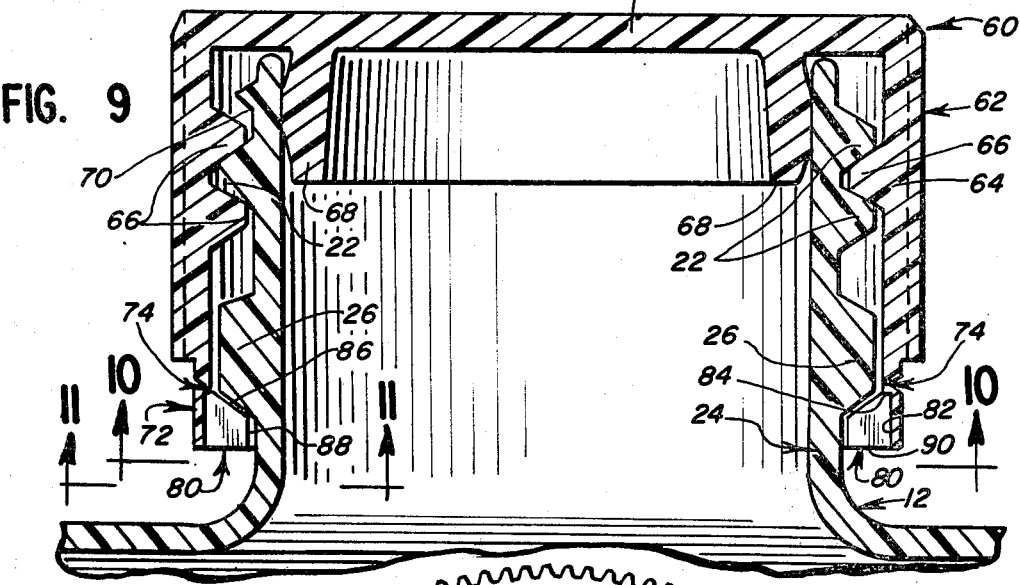
FIG. 9 is a cross-sectional elevational view of an further embodiment of a plastic closure in accordance with the present invention applied to a bottle or like container.
Figure 10:
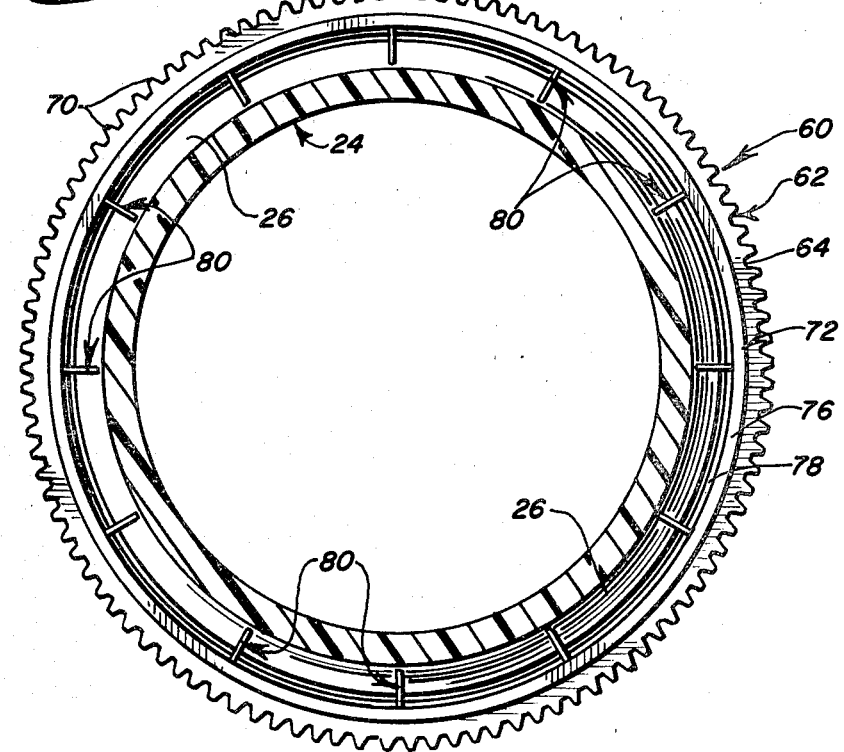
FIG. 10 is a view taken along lines 10—10 of FIG. 9.
Figure 11:
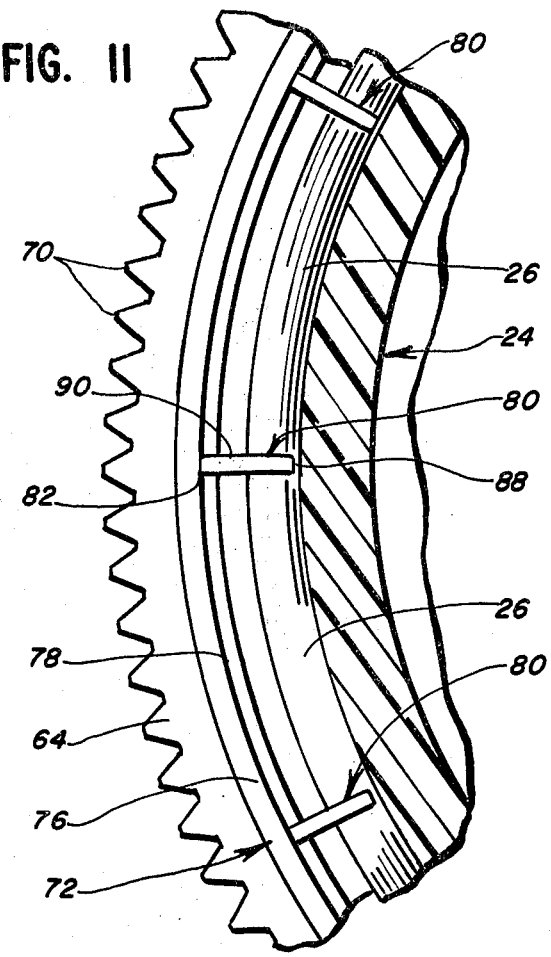
FIG. 11 is an enlarged, fragmentary view similar to FIG. 10.

As shown in FIG. 2, pilfer band 34 may be provided with a vertical score 54 or other suitable area of reduced strength. The inclusion of vertical score 54 accommodates the severance of pilfer band 34 after it has been partially or completely detached from cap 14. Preferably, score 54 extends substantially through pilfer band 34. Since it is sometimes desirable to accommodate removal of pilfer band 34 from container 12 together with cap 14, a non-scored connector portion 56 defined by score line 36, preferably of relatively greater strength than one of ribs 37, joins pilfer band 34 and cap 14 so that pilfer band 34 is removed from the container with the closure after it separates or fractures along vertical score 54, as shown in FIG. 8.

Where removal of pilfer band 34 with cap 14 is desired, an integral connector portion may also be provided by having score line 36 extend substantially about the entire closure, with the depth of the score varied. In this way, a majority of ribs 37 may be simultaneously partially cut when score 36 is made, with one or more ribs 37 being non-scored so that they exhibit relatively greater strength then the other ribs 37 and do not fracture during removal of the closure, thus connecting pilfer band 34 to cap 14 for removal therewith from the container.

While the above-described arrangement of ribs 37 and score line 36 provides the desired fracturable area distinguishing pilfer band 34 and skirt portion 18 and is presently preferred, other scoring arrangements could be provided as will be described.

Figure 3:
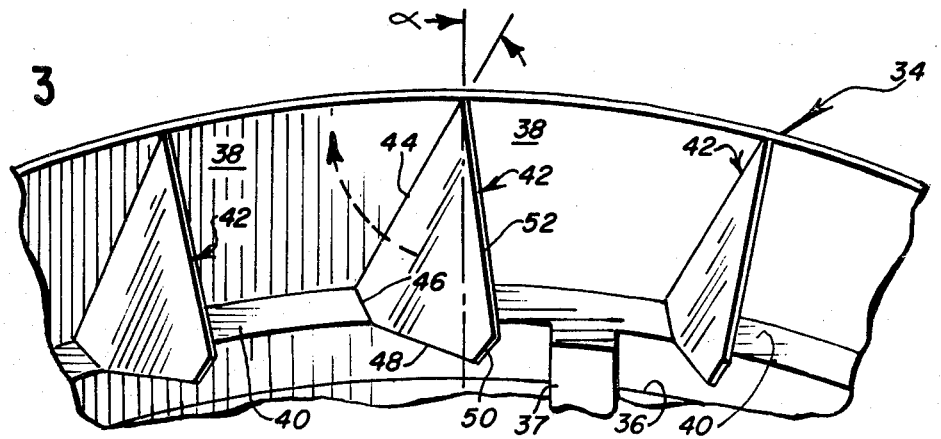
FIG. 3 is a fragmentary perspective view taken along lines 3—3 of FIG. 2.

As best shown in FIG. 3, pilfer band 34 includes a generally vertical, circumferentially extending annular band portion 38. Pilfer band 34 further includes an annular shoulder portion 40 which is integral with and extends inwardly of annular band portion 38.

In order to provide for mechanically locking interaction between pilfer band 34 and container neck 24, pilfer band 34 includes a plurality of relatively thin, flexible, integral wings or fingers 42. Each wing 42 comprises a tongue-like projection preferably having a generally triangular configuration, the wings 42 being spaced circumferentially about the closure 10. It will be understood, however, that the exact configuration of each wing 42 is a matter of design choice in accordance with the principles disclosed herein, and could thus be other than generally triangular.

While each of the wings 42 is generally triangular, they are not actually true triangles and include a plurality of distinct edge portions. An edge portion 44 of each wing 42 is integral with annular band portion 38 of the pilfer band. An edge portion 46 of each wing is integral with annular shoulder portion 40.

Significantly, edge portion 44 is preferably disposed at an angle alpha with respect to the vertical and the rotational axis of closure 10 (See FIG. 3). As will be further described, this angle is significant in that it accommodates application of closure 10 to container 12 without interference from wings 42. Additionally, angle alpha accommodates removal of closure 10 from the portion of the mold in which it is formed which forms the wings 42, relative rotation of this mold portion and the closure facilitating removal. Angle alpha is preferably in the range of approximately 20–60 degrees, with 30 degrees being shown in FIG. 3. It will be appreciated, however, that angle alpha could be zero, i.e., wings 42 would be vertically oriented, for a closure in accordance with the principles herein as will be described.

Each wing 42 further includes a first camming edge portion 48 which is adapted to engage and cam against the lower surface of locking ring 26 during removal of closure 10. Preferably, camming edge portion 48 is complemental to the lower surface of locking ring 26 which it is adapted to engage.

The mechanical locking action of each wing 42 is further provided by a second locking free edge portion 50. Locking edge portion 50 defines the free end portion of wing 42 which is adapted to lockingly engage and interfere with the portion of container neck 24 adjacent and below locking ring 26. Each wing 42 is further provided with an edge portion 52 extending between edge portion 50 and annular band portion 38. This edge portion 52 is preferably disposed at an angle from the horizontal, as shown, so that camming or flexing of the wings away from the container neck during application of the closure is facilitated.

Figure 4:
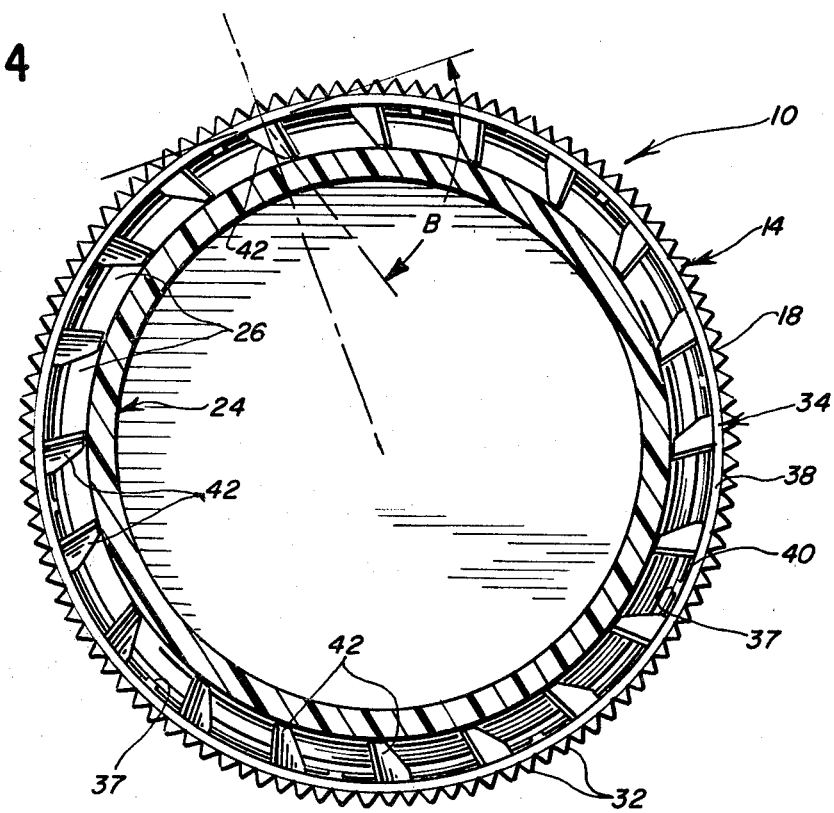
FIG. 4 is a view taken along lines 4—4 of FIG. 1.

As indicated by angle beta in FIG. 4, each wing 42 of the present embodiment preferably extends angularly inwardly of band portion 38 of pilfer band 34. Angle beta is shown measured between a line defined by the intersection of the generally planar surface of each wing and a horizontal plane, and a line tangent to the closure at the intersection of the first line with annular band portion 38. Angle beta is preferably approximately 75 degrees. As further discussed, the significance of this angular disposition is two-fold. First, during application of closure 10 to container 12, angle beta disposes each wing 42 so that it extends away from the direction of rotation during application, thus accommodating flexing of each wing 42 toward annular band portion 38 as the wings are moved by external threads 22 and locking ring 26. Further, this angle accommodates the dimensioning of wings 42 so that their length is sufficient to interengage and firmly abut and tend to lock against the portion of container neck 24 disposed adjacent and below locking ring 26.

It should be noted that during fabrication of the closure in accordance with the present invention, removal of the plunger portion of the mold which forms threads 20 may deform the wings from the orientation in which they are molded. Since removal may result in this undesired deformation, particularly an increasing angle beta shown in FIG. 4, it may be necessary to reorient the wings, such as by manipulation by a suitable implement moved across their surfaces. Experience has shown that the resilience or memory of the wings accommodates exertion of nominal pressure on the wings in order to correctly reorient them. Additionally, variation of the closure and mold temperatures affects the severity of the deformation, and they may thus be adjusted to minimize the problem.

Figure 5:
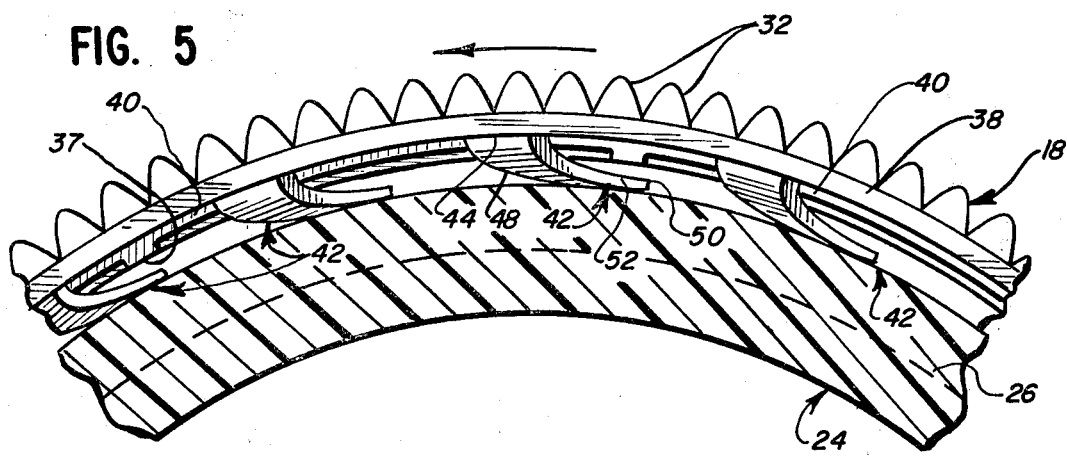
FIG. 5 is a fragmentary view similar to FIG. 4 illustrating the closure of FIG. 1 during application to the container.

With particular reference to FIGS. 3, 4 and 5, the action of pilfer band 34 during application of closure 10 to container 12 will be described. Closure 10 is placed on container neck 24 and moved downwardly thereof. This operation is preferably performed by rotating closure 10 with respect to container 12 so that the internal threads 20 of skirt portion 18 engage and mesh with external threads 22 on container neck 24.

As the closure is moved downwardly of the container, wings 42 of pilfer band 34 are moved into engagement with the upper surface of locking ring 26. Significantly, the angular disposition of each of wings 42 from the vertical (indicated by angle alpha) results in edge portion 52 of each wing 42 engaging the surface of locking ring 26 so that each wing 42 is flexed and urged outwardly of closure 10 away from container 12. This action is clearly illustrated in FIG. 5 where each of wings 42 is shown flexed outwardly of closure 10, with their surfaces each engaging the outer surface of locking ring 26 (the arrow in FIG. 5 indicates the direction of rotation of closure 10 with respect to container neck 24 during application in this fashion). Notably, annular shoulder portion 40 is preferably dimensioned such that it extends inwardly of annular band portion 38 a distance at least equal to the thickness of each wing 42. In this way, additional clearance is provided between band portion 38 and locking ring 26 so that wings 42 may flex to an out-of-the-way position as closure 10 is applied to container 12.

As closure 10 is further applied to container 12 and liner 28 is brought into sealing engagement with the mouth of the container, each of wings 42 moves past locking ring 26 until each wing is disposed adjacent to and below the locking ring. After the wings have moved past the locking ring, they generally resume their original disposition due to their resilient nature or memory, and again extend at an angle from band portion 38. This condition is illustrated in FIGS. 1 and 4, in which camming edge portion 48 of each wing 42 is shown in engagement with the lower surface of locking ring 26.

Significantly, in this embodiment of the present invention locking edge portion 50 of each wing 42 is disposed such that it engages the portion of container neck 24 disposed adjacent to and below locking ring 26. In this arrangement, internal threads 20 and external threads 22 firmly maintain closure 10 in position on container neck 24, facilitating sealing engagement of liner 28 with the mouth of the container.

Figure 6:
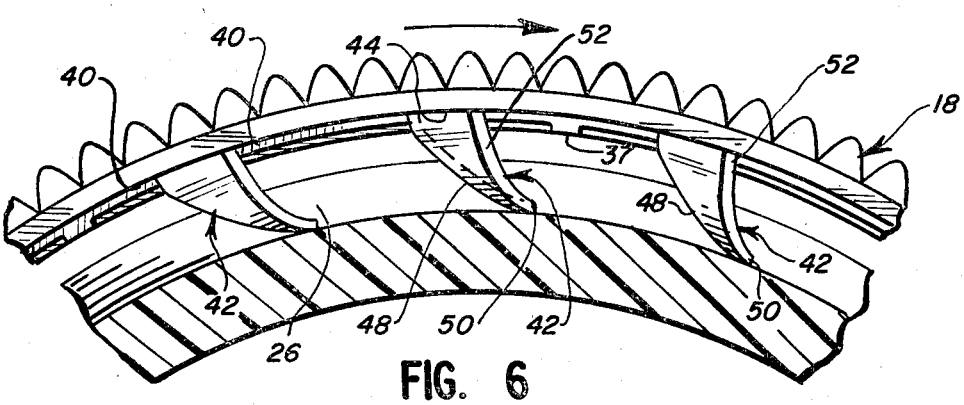
FIG. 6 is a view similar to FIG. 5 illustrating the closure of FIG. 1 during removal of the closure from the container.
Figure 7:
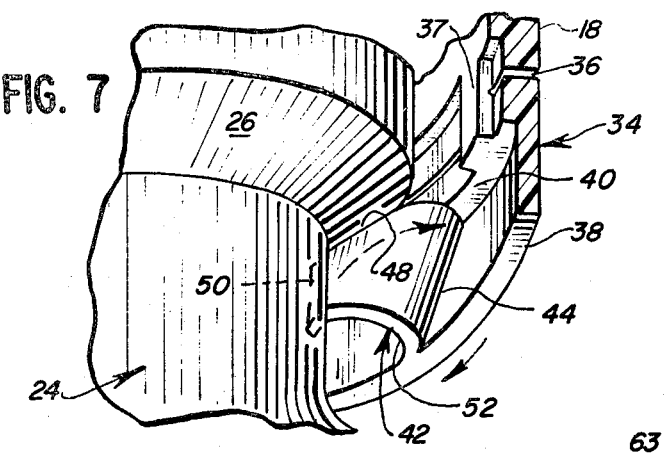
FIG. 7 is a fragmentary perspective view further illustrating the closure of FIG. 1.

With particular reference to FIGS. 6 and 7, the action of wings 42 of pilfer band 34 during removal of closure 10 from container 12 will be described. The arrows in these figures indicate the direction of rotation of closure 10 with respect to container 12 during removal of the closure from the container.

As closure 10 is rotated such as by manual torsion, the action of internal threads 20 and external threads 22 creates an axial force within closure 10 which acts in addition to the torque applied to the closure. As this axial force increases, camming edge portion 48 of each wing 42 is urged into engagement with the surface of locking ring 26. As this occurs, each wing 42 is subjected to forces which act to urge the wing to fold or bend generally along edge portion 44 integral with annular band portion 38, as shown by the phantom arrow in FIGS. 3 and 7. In other words, each wing 42 attempts to increase angle beta by "bending backwards" or collapsing as closure 10 is rotated and the wings are urged into engagement with locking ring 26.

So that pilfer band 34 creates a resistance to the torque introduced by rotation of closure 10 for removal, it is necessary that each wing 42 resists bending backwards or collapsing as camming edge portion 48 is urged and cams against locking ring 26. This result is achieved by the dimensioning of wings 42. Specifically, the length of each wing 42 is such that each extends a distance from band portion 38 greater than the distance between the band portion and container neck 24. Thus, the free end portion of each wing, defined by locking edge portion 50, is urged into interfering, firmly abutting locking engagement or contact with the portion of container neck 24 disposed below and adjacent to locking ring 26.

Additionally, each wing 42, although flexible, has sufficient resiliency and thickness to effectively prevent locking edge portion 50 from collapsing and "moving past" container neck 24 as the wings are urged about edge portion 44 by camming edge portion 42 engaging locking ring 26. Thus, a resistance to the torque of rotation of closure 10 is created in pilfer band 34 as wings 42 resist the camming interaction of the wings with locking ring 26, since the lack of clearance between the band portion 38 and locking ring 26 causes the wings to effectively interfere and mechanically lock with container neck 24 so as to prevent the wings from collapsing or bending backwards.

As the resistance to the rotation of closure 10 increases, a point is reached where the resistance is greater than the torque carrying strength of the fracturable skirt portion including frangible ribs 37. When this occurs, ribs 37 between pilfer band 34 and cap 14 fracture or fail resulting in detachment of pilfer band 34 from cap 14. Thus, pilfer band 34 clearly indicates that removal of closure 10 has been attempted.

As noted above, pilfer band 34 may be provided with an area of reduced strength such as vertical score 54. Connector portion 56 thus accommodates removal of pilfer band 34 from container 12 together with cap 14 by exerting a tensile force on pilfer band 34 causing it to sever at score 54 so that it is removed from container 12 together with the remainder of closure 10. This is clearly illustrated in FIG. 8 where pilfer band 34 is shown "pig-tailed" and being removed from container 12 with cap 14, the cap and the pilfer band being joined by connector portion 56 after ribs 37 and band portion 38 at score 54 have fractured.

Of fundamental importance with regard to the design of the present plastic closure is the relationship of the exact dimensions of wings 42 and the strength of the fracturable skirt portion. Specifically, it is necessary that the resistance to removal by pilfer band 34 created by wings 42 be greater than the force required to fracture the weakened portion of the closure. Otherwise, of course, pilfer band 34 would not perform its intended function since the wings would collapse or otherwise deform without the closure fracturing as intended. Naturally, the weakened skirt portion of the closure must be sufficiently strong so that it remains intact during application of the closure to the container. Additionally, the wings preferably exhibit sufficient flexibility to accommodate movement outwardly of the closure away from the container during application to the container, yet have sufficient resilience or memory to generally resume their original disposition after moving past the locking ring or other portion of the container neck with which they are designed to interact.

Thus, if the force required for causing the ribs 37 to fail is relatively high, the number and resilience (a function of dimension and strength of material) of the wings 42 must be correspondingly increased. Conversely, if ribs 37 are provided such that a relatively small force is required for separating pilfer band 34 from the remainder of closure 10, the number of wings 42 and their individual stiffness may be decreased. Thus, the number of wings illustrated in the present embodiment (approximately 20) may be increased or decreased depending upon relative strength of the weakened skirt portion of the closure 10. In view of this, it is particularly desirable to reduce the number and thickness of wings 42 to the minimum required to provide sufficient resistance to rotation for removal of closure 10, since economy of materials is of importance in economically producing plastic closures in high volume.

With reference now to FIGS. 9–12, a further embodiment of a plastic closure having a pilfer band arrangement in accordance with the present invention is illustrated. Plastic closure 60 is similar to plastic closure 10 illustrated in FIGS. 1–7, and is shown threaded to a container 12 with a threaded neck 24 and locking ring 26 as illustrated in FIG. 1.

Closure 60 includes a molded shell or cap 62 having a generally circular top wall portion 63 and a generally cylindrical skirt portion 64 depending integrally therefrom. Skirt portion 64 includes internal threads 66 which are adapted to mate and engage with container neck threads 22 on container neck 24 so that closure 60 is rotatable for application to and removal from container 12. While closure 60 has been illustrated as threaded to container 12, it will be appreciated that the subject embodiment of the present invention could be adapted for closures which are otherwise retained on a container.

In order to effect sealing of the mouth of container 12, closure 60 is illustrated as including a typical plug seal portion 68 associated with top wall portion 63 of the closure. Typical plug seal arrangements provide for sealing engagement of the closure with a portion of the internal surface of the container neck, as distinguished from the sealing arrangement of closure 10 illustrated in FIG. 1. Closure 60 includes external ribs 70 for facilitating gripping of the closure during application and removal.

Closure 60 further includes an integral pilfer band 72 depending from skirt portion 64 and defining the lower edge portion of closure 60. Pilfer band 72 is distinguished from skirt portion 64 by a fracturable area of reduced strength.

Figure 12:
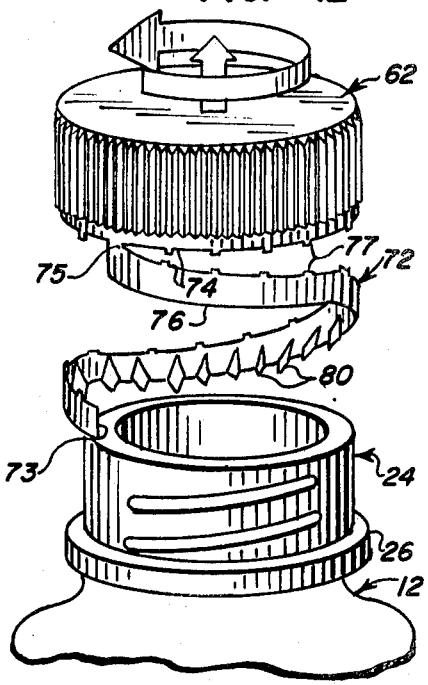
FIG. 12 is a perspective view illustrating removal of the closure of FIG. 9.

In this embodiment, the fracturable area is provided by a series of circumferentially spaced scores 74 which define frangible bridges 77 (see FIG. 12). Bridges 77 detachably join skirt portion 64 and pilfer band 72, and remain intact during application of the closure to container 12. Scores 74 may be suitably provided by mounting closure 60 on a mandrel or other support and bringing a circular knife into contact with the closure. Preferably, the scoring knife may include a plurality of slots in its cutting surface so that it is discontinuous, and thus forms a series of scores 74. So that bridges 77 are properly formed, scores 74 preferably extend substantially through the closure wall. If it is desired to weaken bridges 77 so that they fracture as intended, they may be partially scored or cut.

Scores 74 provide closure 60 with a fracturable weakened skirt portion so that when pilfer band 72 resists rotation of closure 60 with respect to container 12 for removal therefrom, frangible bridges 77 fracture thus detaching pilfer band 72 from skirt portion 64 and clearly indicating attempted opening of the container. Depending upon the results required, all of bridges 77 may be designed to fracture so that pilfer band 72 is completely detached from skirt portion 64 of closure 60 so that the pilfer band remains on container 12 after removal of cap 62. Alternatively, pilfer band 72 may include one or more vertical scores 73 and one or more integral connectors 75 of relatively greater strength than bridges 77 for connecting pilfer band 72 with skirt portion 64 whereby pilfer band 72 may be removed from container 12 with cap 62. FIG. 12 clearly illustrates removal of closure 60 from container 12, with bridges 77 and the band portion at score 73 having fractured and the cap 62 joined to the "pig-tailed" pilfer band 72 by connector 75.

As illustrated, pilfer band 72 includes an annular band portion 76 and an annular shoulder portion 78 extending inwardly of band portion 76. In accordance with the present invention, pilfer band 72 further includes a plurality of wings or fingers 80, similar to wings 42 shown in FIG. 3, circumferentially spaced and integrally extending from band portion 76 and shoulder portion 78 of pilfer band 72.

Each wing 80 comprises a relatively thin, flexible, tongue-like projection extending integrally from the band portion 76, connected therewith along integral edge portion 82. Each wing 80 further includes a shoulder edge portion 84 joined to annular shoulder portion 78.

In order to effect engagement of wings 80 with locking ring 26 on container neck 24, each wing includes an engagement edge portion 86, preferably complemental to the lower surface of locking ring 26 which it is adapted to engage. Edge portion 86 of each wing 80 is urged into engagement with locking ring 26 when closure 60 is rotated for removal from container 12.

Wings 80 of pilfer band 72 include a free edge portion 88 which defines the free end portion of each wing. Significantly, the free end portion of each wing 80 is illustrated as being slightly spaced from the portion of container neck 24 adjacent and below locking ring 26. Unlike the embodiment of the present invention previously described in which resistance to rotation by the pilfer band of closure 10 was enhanced by mechanical interlocking of each wing 42 with a portion of container neck 24, wings 80 of the closure of the present embodiment are adapted to principally engage only the locking ring 26 of container neck 24, with engagement of the wings with other portions of the container neck being unnecessary.

As shown, each wing 80 includes an edge portion 90 extending between edge portion 88 and integral edge portion 82. It will be observed that each wing 80 is generally four sided, and has an overall configuration differing from the generally triangular configuration of wings 42 of previously described closure 10. As noted, the configuration of the wings may be further varied without departing from the principles of the present invention.

In this embodiment, each wing is illustrated as vertically disposed. This orientation would correspond to an angle alpha of zero with reference to the angular disposition of wings 42 in FIG. 3. While the vertical disposition of wings 80 provides the desired interaction with the locking ring of the container neck during removal of the closure, wings 80 could be angularly disposed with respect to the axis of closure 60 and container 12.

As discussed, the number of wings provided for the pilfer band arrangement relates to the specific requirements of application of the closure to a container, and the strength of the fracturable areas, such as frangible bridges 77, which are designed to fail or fracture during removal of the closure from the container. Thus, a fewer number of wings 80 are illustrated than the number of wings 42 shown in FIGS. 1-7, but each wing 80 is preferably of sufficient strength and resilience to result in fracture of the weakened portions of the closure for indicating removal.

A further distinction between wings 80 and previously described wings 42 is that wings 80 are illustrated as extending radially inward of closure 60 toward container neck 24. In other words, the angle beta shown in FIG. 4 for wings 42 would be approximately 90 degrees for wings 80, although wings 80 could be similarly angularly disposed as are wings 42.

The application and removal of closure 60 to and from container 12 is similar to that of closure 10 described above. During application to the container, the flexible nature of each wing 80 accommodates flexing and movement of each wing toward band portion 76 as closure is rotatably applied to the container and displaced axially thereof. Thus, wings 80 would take on a disposition similar to the disposition of wings 42 as shown in FIG. 5. In this way, movement of wings 80 past threads 22 and locking ring 26 of container neck 24 is accommodated, with sufficient clearance provided between container neck and annular band portion 76 of pilfer band 72 to allow the wings to flex out of the way.

After wings 80 have moved past and are disposed beneath locking ring 26 of container neck 24, plug seal portion 68 sealingly engages with the mouth of the container. When wings 80 are in this position, their resilience or memory results in them generally resuming the disposition they had before closure 26 was applied to container 12. Thus, each wing 80 extends generally radially inward of closure 60, with edge portion 86 of each wing adapted to engage the lower surface of locking ring 26.

During removal of closure 60 from container 12, the function of pilfer band 72 is similar to the function of pilfer band 34 described above. As closure 60 is rotated for removal and thus displaced axially of container 12, each wing 80 is urged into engagement with the surface of locking ring 26. As this takes place, each wing 80 is urged to bend about its edge portion 82 integral with band portion 76. In this embodiment, the resilience of each wing 80 is sufficient to resist bending "backwards" (opposite the direction of bending during application) or collapsing, and each wing is urged into frictional engagement with the lower surface of locking ring 26.

As closure 60 is further rotated and the forces generated at the interface of edge portion 86 of each wing 80 with locking ring 26 increase, the friction generated at this interface also increases and thus each wing 80 resists rotation with respect to the locking ring. In this way, pilfer band 72 resists rotation as closure 60 is rotated for removal from container 12, and thus generates shear forces in frangible bridges 77 connecting pilfer band 72 with skirt portion 74. When these shear forces are sufficiently high, frangible bridges 77 fracture, and thus pilfer band 72 is detached from cap 62, clearly indicating that closure 60 has been rotated for removal from container 12.

Notably, this embodiment of the present invention provides wings 80 of sufficient resiliency so that mechanical interference of the wings with a portion of the container neck disposed adjacent and below locking ring 26 is not necessary for providing the desired resistance to rotation of the closure.

The number of wings 80, their angular disposition, and their overall configuration and dimensions may be varied depending upon the resistance to rotation required for fracturing frangible bridges 77, as well as the frictional properties of the materials from which closure 60 and container 12 are manufactured. Where the materials of which the closure and container are fabricated do not exhibit sufficient friction to provide the desired resistance to rotation when wings 80 are urged against locking ring 26, the surface of locking ring 26 may be provided with a series of serrations or other surface irregularities for enhancing the frictional engagement and contact between the wings 80 and locking ring 26. Such serrations or surface irregularities may be radially or otherwise angularly disposed such that they conform to the angular disposition of the wings corresponding to angle beta shown in FIG. 4 to enhance engagement with the wings.

Figure 15:
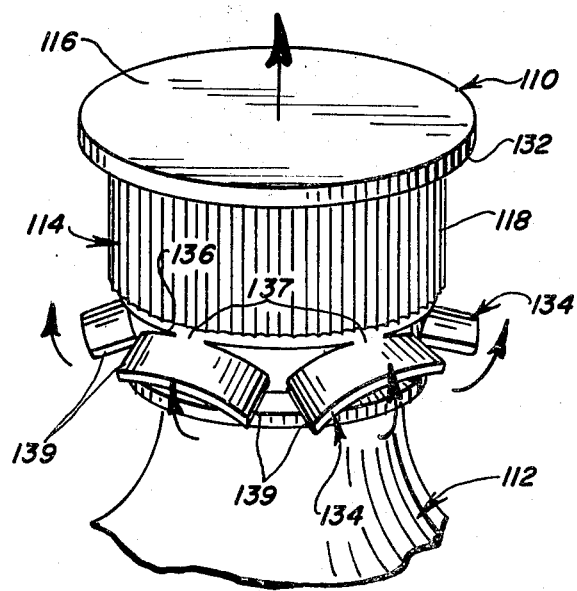
FIG. 15 is a perspective view of the closure of FIG. 13 during removal from a container.
Figure 13:
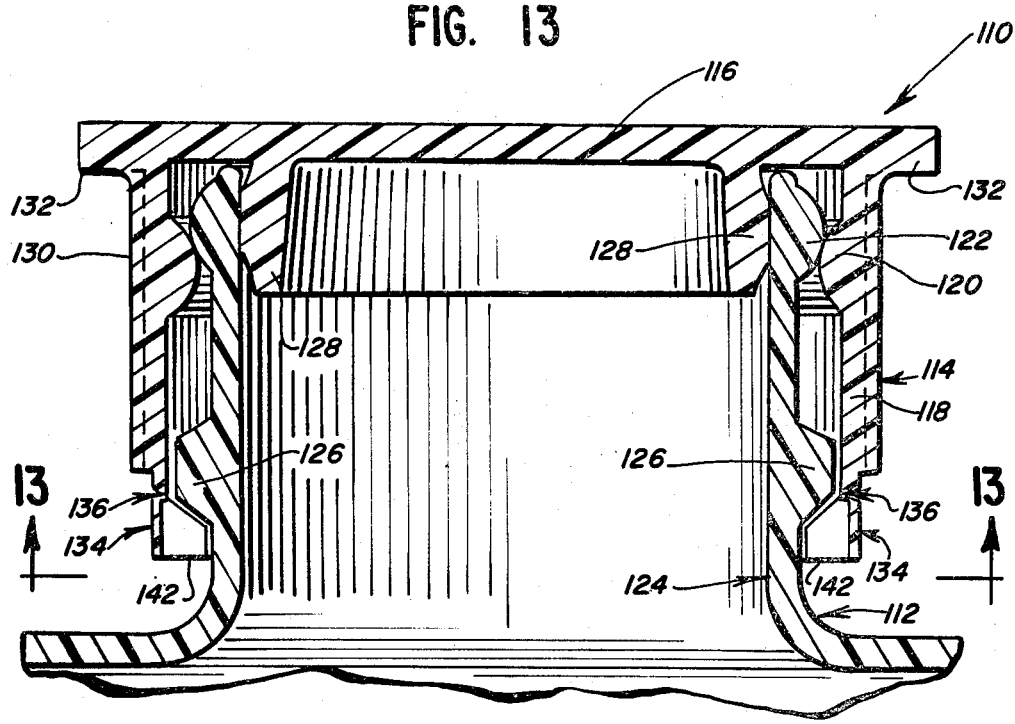
FIG. 13 is a cross-sectional elevational view of a further embodiment of a plastic closure in accordance with the present invention.
Figure 14:
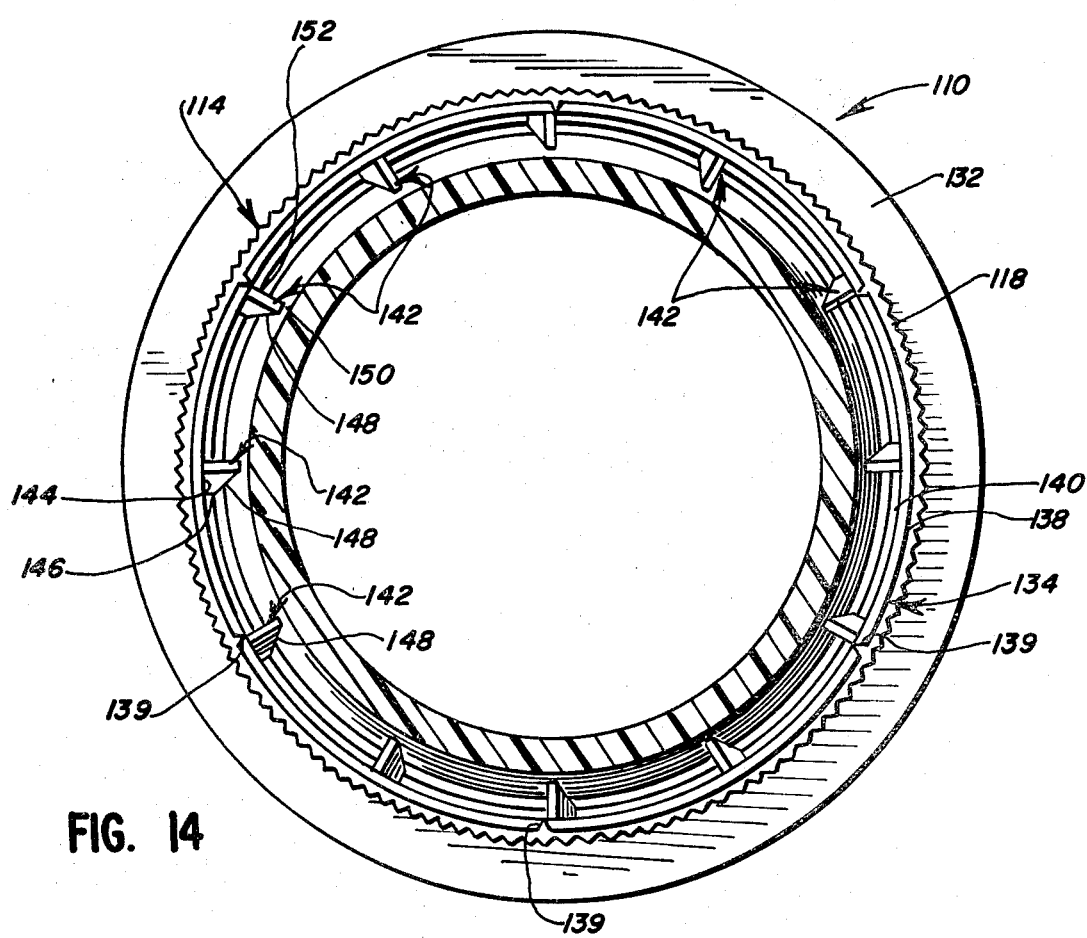
FIG. 14 is a view taken along lines 13—13 of FIG. 12.

With reference now to FIGS. 13-15, a further embodiment of a closure in accordance with the present invention is illustrated. Plastic closure 110 illustrated in these figures is of the type adapted to be applied to a bottle or like container 112 by axial displacement of the closure relative to the container with little or no relative rotation required during application or removal.

Closure 110 includes a shell or cap 114 including a generally circular top wall portion 116 and a generally cylindrical skirt portion 118 depending integrally therefrom. Cap 114 includes an internal, annularly extending closure lock portion 120 which is adapted to cooperate in a snap-like fashion with an external annular neck lock portion 122 integral with container neck 124. It will be appreciated that the exact configuration of lock portions 120 and 122 may be a matter of design choice, with the arrangement shown for purposes of illustration.

Container neck 124 of container 112 further includes an annular bead portion or locking ring 126 spaced from the mouth of the container. The sealing of container 112 is effected by closure 110 by the plug seal portion 128 associated with top wall portion 116 of the closure. As noted, a sealing arrangement other than a so-called plug seal could be provided for a closure in accordance with the present invention. Closure 110 includes external ribs 130 for facilitating gripping of the closure during application and removal, and may include a raised shoulder portion 132 for accommodating removal of the closure from the container.

In this embodiment of the present invention, closure 110 includes an integral pilfer band 134 depending from skirt portion 118 which defines the lower edge portion of the closure. Pilfer band 134 is distinguished from skirt portion 118 by a score line 136 extending peripherally of closure 110. In this embodiment, score line 136 preferably comprises a series of scores preferably cut substantially through the closure wall whereby a corresponding number of connector portions 137 are defined which integrally connect portions of pilfer band 134 with skirt portion 118.

In order to accommodate removal of pilfer band 134 from container 112 with cap 114 of closure 110, pilfer band 134 includes an annular band portion 138 having a plurality of vertical scores 139 or otherwise weakened, fracturable areas. Preferably, vertical scores 139 are spaced about pilfer band 134 so that portions of the pilfer band between adjacent vertical scores 139 are each connected with skirt portion 118 of cap 114 by at least one connector portion 137. As will be described, scoring of closure 110 in this fashion accommodates splitting and severing of pilfer band 134 during removal of the closure so that the pilfer band is removed from container 112 with cap 114.

As shown, pilfer band 134 includes an annular shoulder portion 140 extending inwardly of the closure from an annular band portion 138. In accordance with the present invention, pilfer band 134 further includes a plurality of circumferentially spaced, inwardly extending wings or fingers 142 each comprising a relatively thin flexible projection integral with annular band portion 138.

As previously discussed, the number, angular disposition, relative dimension, and configuration of each wing 142 may be selected or varied in accordance with requirements of the closure. In this embodiment, each wing 142 is similar to each wing 80 illustrated in FIGS. 9-12, and includes an edge portion 144 integral with annular band portion 138. Each wing 142 further includes a shoulder edge portion 146 integral with shoulder portion 140, and a camming edge portion 148, preferably complemental to the lower surface of locking ring 126. A free edge portion 150 defines the free end portion of each wing, and an edge portion 152 extends between edge portion 150 and annular band portion 138 of the pilfer band. Notably, each wing 142 is illustrated as extending radially inwardly of band portion 138 (i.e., angle beta as illustrated in FIG. 4 would be approximately 90 degrees). Preferably each wing 142 is disposed at an angle with respect to the axis of closure 110, this angular disposition accommodating movement of each wing 142 to an out of the way disposition during application of the closure to container 112.

Application of closure 110 to container 112 may be effected with or without relative rotation of the closure. Displacement of the closure axially of container neck 125 causes the wings 142 of pilfer band 134 to engage portions of the neck and cam or flex outwardly of the container. When plug seal portion 128 seals the container mouth and lock portions 120 and 122 cooperate to retain the closure on the container, wings 142 have moved past locking ring 126 and are disposed therebeneath. When the wings are in this position, their resilience or memory causes them to resume their generally inward disposition relative to band portion 138.

As illustrated in this embodiment, the present invention provides a closure with a pilfer band arrangement which is adaptable for use on containers to which the closure is rotably applied, or applied with little or no relative rotation. Thus, pilfer band 134 of closure 110 is provided such that axial displacement of the closure with respect to container 112 during removal, with little or no relative rotation, will result in fracturing of the pilfer band for indicating removal of the closure from the container.

In this embodiment, the interaction of wings 142 with locking ring 126 is such that during displacement of closure 110 axially of container neck 124 for removal therefrom, edge portion 148 of each wing 142 is urged into engagement with the lower surface of locking ring 126. This engagement may take place with little or no relative rotation between wings 142 and locking ring 126. Thus, the result of the interaction between wings 142 and locking ring 126 is to urge or cam the wings away from and outwardly of locking ring 126 and container 124, and thus creating tensile forces within the annular band portion 138 of pilfer band 134.

As closure 110 is further moved axially of container neck 124, tensile forces created in pilfer band 134 become sufficiently great to cause failure or fracture of the pilfer band at vertical scores 139 in band portion 138. As pilfer band 134 thus splits and separates along scores 139, the pilfer band is detached from cap 114 along the scores which define score line 136. This action is clearly illustrated in FIG. 14 where the severed portions of pilfer band 134 flex and move outwardly of container 112 about integral connector portions 137 between the pilfer band and skirt portin 118. After the pilfer band is fractured in this fashion, closure 110 may be removed from container 112, with the severed portions of pilfer band 134 staying with skirt portion 118. Thus, this embodiment of the present invention is particularly suited for closures which are applied and removed from containers with little or no relative rotation.

While the embodiments of the present inventions heretofore described have all shown closures which include some type of arrangement for effecting retention of the closure on the container, such as threads or a snap-type lock, a further feature of the present invention should be noted. Specifically, it will be appreciated that if desired, a closure could be formed with a plurality of peripherally spaced wings such as described which themselves function to retain the closure on the container. In other words, the present invention could be adapted to provide a closure wherein a plurality of wings, rather than threads or a snap-lock, retain the closure on the container. If desired, fracturable areas could be included in such a closure whereby the wings would function in somewhat of a duel capacity, providing both closure retention as well as indication of opening.

Figure 16:
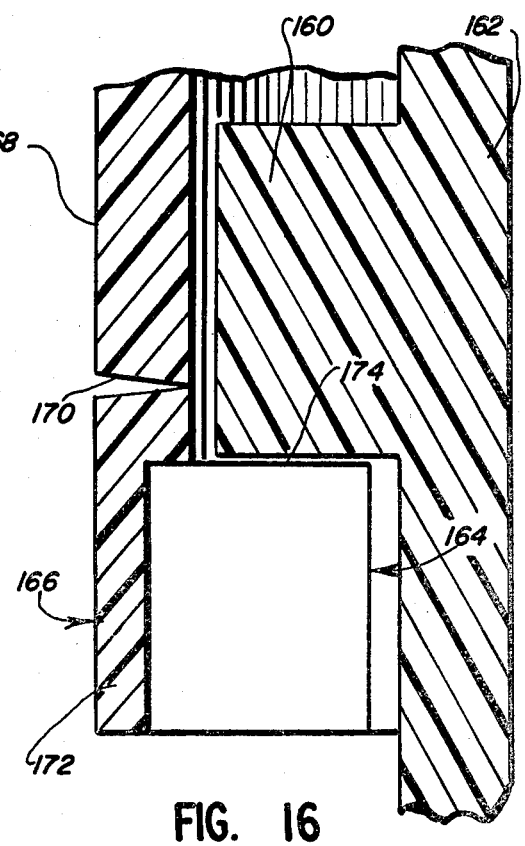
FIG. 16 is a perspective view illustrating a further embodiment of a closure in accordance with the present invention.

With reference now to FIG. 16, a variation of the above-described embodiments is illustrated. This figure illustrates an enlarged view of the interface between a locking ring 160 which is part of a container neck 162, and a wing 164 of a pilfer band 166 depending from a skirt portion 168 of a closure. A weakened skirt portion 170 distinguishes pilfer band 166 from skirt portion 168.

Wing 164 shown in FIG. 16 extends integrally inwardly of an annular band portion 172 of pilfer band 166 similar to the disposition of wings 42, 80, and 142 described above. Thus, wing 164 may be disposed angularly with respect to annular band portion 172 as well as with respect to the axis of the closure of which it is a portion.

In distinction from the embodiments previously described, wing 164 illustrated in FIG. 15 is shown being adapted to engage a surface of locking ring 160 disposed generally at a right angle to the remainder of the surface of container neck 162. Thus, the adaptability of the pilfer band arrangement of the present invention to bottles or containers having locking rings or similar annular bead portions of various configurations will be readily appreciated. A camming edge portion 174 of wing 164, which is preferably complemental to the surface of locking ring 160 with which it is adapted to engage, extends at a generally right angle with respect to skirt portion 168 of the closure.

Depending upon the type of closure of which wing 164 is a part, axial displacement of the closure with respect to container neck 162 urges wing 164 into engagement with locking ring 160, thus providing resistance to rotation for pilfer band 166, or cantilevering and flexing of the wing outwardly of container neck 162 for tensioning pilfer band 166 so that areas of reduced strength on the pilfer band fail for indicating removal of the closure from the container.

From the foregoing, it will be appreciated that the function of a pilfer band in accordance with the principles of the present invention relates to the relatively flexible nature of the pilfer band wings which permits them to flex laterally or outwardly of the closure during application, while they still exhibit sufficient resilience in a generally vertical direction to provide the desired interaction with the container neck. To this end, the wings illustrated have been described as dimensioned to provide these characteristics, with each wing having a generally uniform thickness and being relatively thin in a circumferential direction. However, the desired results may also be achieved by providing each wing with a portion of relatively reduced thickness at or near in integral connection with the band portion of the pilfer band. In this way, each wing is provided with a "hinge" to provide the desired flexibility which would not depend on the overall thickness of the wing.

Thus, it will be appreciated that the exact configuration of the wings on a pilfer band in accordance with the present invention may be widely varied, and that the configuration may be readily adapted for use on containers having neck portions of different designs.

Thus, a novel plastic closure including a pilfer band arrangement is disclosed which accommodates ease of application of the closure to containers. From the foregoing, it will be observed that numerous variations and modifications may be effected without departing from the true spirit and scope of the novel concept of the present invention. It will be understood that no limitation with respect to the specific embodiments illustrated herein is intended or should be inferred. It is, of course, intended to cover by the appended claims all such modifications that fall within the scope of the claims.

What is claimed is:

1. A closure for a container having a threaded neck including an annular locking ring portion comprising:
   a cap having a top wall portion, and a cylindrical threaded skirt portion depending from said top wall portion, and
   pilfer band means depending from said skirt portion and distinguished therefrom by a fracturable area, said pilfer band means including an annular band portion and a plurality of wing means each extending integrally inwardly of said band portion, and each being adapted to flex generally about an axis disposed at an acute angle to the axis of said cap during application of said closure to said container, whereby after said closure is applied to said container, said wing means are adapted to engage a lower surface of said locking ring portion when said closure is rotated for removal from said container thereby fracturing said fracturable area.

2. A closure in accordance with claim 1, wherein said wing means comprise a plurality of relatively flexible wings spaced circumferentially of said closure, each of said wings engaging said locking ring portion of said neck for resisting rotation of said closure for removal from said container.

3. A closure in accordance with claim 2, wherein said wings each comprise a first edge portion integral with said band portion, and a second edge portion engageable with said locking ring portion.

4. A closure in accordance with claim 3, wherein each of said wings includes a free end portion engageable with a portion of said neck disposed adjacent to said locking ring portion.

5. A closure in accordance with claim 3, wherein each of said wings extend angularly inwardly of said annular band portion and each being dimensioned so as to interferingly engage a portion of said neck adjacent said locking ring portion during rotation for removal of said closure from said container whereby said pilfer band resists rotational movement of said closure for removal so that continued rotation for removal fractures said fracturable area.

6. An integrally molded plastic closure for application to the threaded neck of a container having an annular locking ring, comprising:
   a cap having a top wall portion and a side wall skirt portion depending from said top wall portion, and
   pilfer band means joined to said skirt portion by a peripheral weakened skirt portion,
   said pilfer band means including wing means extending inwardly of said closure, said wing means being adapted to flex outwardly of said container about non-horizontal hinge means during application of said closure to said container, and said wing means being adapted to engage a lower surface of said locking ring during rotation of said closure for removal from said container whereby said peripheral weakened skirt portion fractures.

7. A closure in accordance with claim 6, wherein said pilfer band includes a continuous annular band portion, said wing means being integral with and extending inwardly of said band portion.

8. A closure in accordance with claim 7, wherein said wing means comprise a plurality of relatively flexible wings spaced circumferentially about said closure, each of said wings extending angularly inwardly of said band portion and including cam means adapted to engage with said locking ring whereby a free end portion of each wing is urged into locking engagement with said neck below said locking ring during rotation of said closure for removal from said container whereby said pilfer band means resists removal from said closure and said weakened skirt portion fractures.

9. A closure in accordance with claim 7, wherein said wing means comprise a plurality of circumferentially spaced relatively flexible wings, each of said wings including an edge portion adapted to frictionally engage said locking ring during rotation for removal of said closure whereby said pilfer band means resists rotation relative to said container and said weakened skirt portion fractures.

10. A closure in accordance with claim 8, wherein each wing is disposed angularly to the axis of rotation for removal of said closure from said container.

11. A closure in accordance with claim 8, wherein said pilfer band means further includes a shoulder portion extending inwardly of said band portion a distance at least equal to the thickness of each of said wings, said shoulder portion accommodating flexing of said wings outwardly of said closure during application to said container.

12. A closure in accordance with claim 8, wherein said cam means comprise a first edge portion of each wing generally complemental to said lower surface of said locking ring.

13. A closure in accordance with claim 8, wherein each of said wings having a length greater than the distance between said band portion and the portion of said neck with which the free end portions of said wings are engageable when said closure has been applied to said container.

14. A closure in accordance with claim 8 or 9, wherein
said weakened skirt portion includes peripherally extending score means distinguishing said skirt portion from said pilfer band means.

15. A closure in accordance with claim 8 or 9, wherein
said pilfer band means includes an area of reduced strength whereby said pilfer band means is severable and removable from said container.

16. A closure in accordance with claim 15, and
a relatively strong connector portion integrally joining said pilfer band means to said skirt portion whereby said pilfer band means is removable from said container with said cap.

17. A closure in accordance with claim 13, and
liner means carried by said closure adjacent said top wall portion for sealingly engaging said container.

18. A closure for a container having a neck, comprising:
a cap having a top wall portion and an integral skirt portion depending from said top wall portion, and
pilfer band means joined to said skirt portion and depending therefrom,
said pilfer band means including engagement means adapted to engage the neck of the container comprising a plurality of peripherally spaced, inwardly extending wing means adapted to engage the neck during removal of said closure from said container, each of said wing means being adapted to flex about an axis disposed at an acute angle to the axis of said closure during application of said closure to said container.

19. A closure in accordance with claim 18, wherein
said pilfer band means comprise an annular band portion, and each of said wing means being integral with said annular band portion.

20. A closure in accordance with claim 19, wherein each of said wing means comprises a relatively flexible wing.

21. A closure in accordance with claim 18, and
frangible means connecting said pilfer band means and said skirt portion, said frangible means fracturing during said removal.

22. A closure in accordance with claim 21, wherein
said frangible means comprise a plurality of peripherally spaced bridges integral with said skirt portion and said pilfer band means, said frangible means fracturing when said closure is rotated for removal from said container and said pilfer band means resists said rotation.

23. A closure in accordance with claim 21, wherein
said frangible means comprise a plurality of frangible bridges joining said skirt portion and said pilfer band means, and a connector portion integrally connecting said skirt portion and said pilfer band means, and an area of reduced strength on said pilfer band means, whereby said pilfer band means is severable and removable from said container with said cap after said frangible bridges and said area of reduced strength fracture.

24. A closure in accordance with claim 19, and
indicating means comprising at least one area of reduced strength on said pilfer band means whereby during removal of said closure from said container said area of reduced strength is adapted to fracture after engagement of said wing means with said container urges said wing means outwardly of the container whereby said pilfer band means is removable from said container with said cap.

25. A closure in accordance with claim 22 or 23,
wherein each of said wing means includes a first edge portion adapted to cam against an annular bead portion of said container neck, and a free end portion adapted to interferingly engage a portion of said container neck adjacent said annular bead when said first edge portion cams against said annular bead portion whereby said frangible means fracture.

26. A closure in accordance with claim 22 or 23,
wherein said wing means are adapted to frictionally engage a portion of said container neck for resisting rotation of said closure with respect to said container.

27. A closure in accordance with claims 20 or 21, wherein each of said wing means extends radially inwardly of said annular band portion.

28. A closure for a container having a threaded neck to which said closure is adapted to be rotatably applied, comprising: p1 a closure cap having a top wall portion and a threaded skirt portion integrally depending from said top wall portion,
pilfer band means integral with said skirt portion and depending therefrom, and
fracturable means distinguishing said pilfer band means from said skirt portion,
said pilfer band means comprising a band portion and a plurality of circumferentially spaced wing means integral with said band portion and extending generally inwardly thereof, said wing means being adapted to move outwardly of said container toward said band portion during application of said closure to said container by rotating said closure in one direction, and said plurality of wing means having first edge portions integral with said band portion and second edge portions adapted to engage a non-vertical portion of said threaded neck during rotation of said closure in the other direction for removal whereby said pilfer band means resist said rotation for removal and said fracturable means fracture, said plurality of wing means being outwardly movable generally about respective axes which are non-perpendicular to the rotational axis of said closure.

29. A closure in accordance with claim 28, wherein said plurality of wing means comprise a plurality of peripherally spaced relatively flexible wings.

30. A closure in accordance with claim 29, wherein each of said wings is adapted to frictionally engage said container neck for resisting said rotation for removal.

31. A closure in accordance with claim 29, wherein each of said wings is adapted to cam against and mechanically interengage and interfere with said container neck for resisting said rotation for removal.

32. A closure for a container having a threaded neck to which said closure is adapted to be rotatably applied, comprising:

a closure cap having a top wall portion and a threaded skirt portion integrally depending from said top wall portion, pilfer band means integral with said skirt portion and depending therefrom, and fracturable means distinguishing said pilfer band means from said skirt portion, said pilfer band means comprising an annular band portion and a plurality of wing means integral with said annular band portion and extending generally inwardly thereof, said wing means each being adapted to move outwardly of said container toward said band portion during application of said closure to said container by rotating said closure in one direction, and said wing means being adapted to engage a portion of said threaded neck during rotation of said closure in the other direction for removal whereby said pilfer band means resists said rotation for removal and said fracturable means fracture, each said wing means being outwardly movable generally about an axis which is non-perpendicular to the rotational axis of said closure, said plurality of wing means comprising a plurality of peripherally spaced relatively flexible wings, each of said wings being adapted to cam against and mechanically interengage and interfere with said container neck for resisting said rotation for removal, said closure being adapted for application to a container having an annular locking ring integral with the container neck, each of said wings including a camming edge portion adapted to cam against said locking ring and a free end portion adapted to mechanically interengage and interfere with a portion of said neck adjacent said locking ring.

33. A closure for a container having a neck including a locking ring portion, comprising:

a cap having a top wall portion and a skirt portion depending integrally therefrom, and pilfer band means joined to said skirt portion, said pilfer band means including a plurality of inwardly extending wing means, said wing means being adapted to move below said locking ring portion during application of said closure to said container, and to engage said locking ring portion during removal of said closure from said container whereby said pilfer band means resists removal of said closure from said container, each said wing means being movable generally about an axis which is non-perpendicular to the axis of said closure.

34. A closure in accordance with claim 33, wherein each of said wing means includes a camming edge portion adapted to engage said locking ring during relative axial displacement of said closure relative to said container whereby said wing means are urged outwardly of said container and said pilfer band means fracture.

35. A closure in accordance with claim 33, wherein said wing means each include an edge portion adapted to frictionally engage said locking ring portion during axial displacement of said closure relative to said container whereby said pilfer band means resists rotation of said closure relative to said container.

36. A closure in accordance with claim 33, wherein said wing means each include an edge portion adapted to engage and cam against said locking ring portion during axial displacement of said closure relative to said container whereby a free end portion of each of said wing means is urged into engagement with a portion of said container neck disposed adjacent said locking ring portion whereby said pilfer band means resist removal of said closure from said container.

37. A closure in accordance with claims 34, 35, or 36, wherein each of said wing means extends radially inwardly of said closure.

38. A molded plastic closure for a container having a threaded neck and an annular locking ring portion below the neck thread, comprising:

a cap portion having a top wall portion and a cylindrical threaded skirt portion, and a pilfer band means connected to said skirt portion by a weakened area, fracturable by manual torsion, said pilfer band means including a plurality of inwardly directed spaced wings, the inner edge portions of the wings generally defining a circle having a diameter less than that of said annular locking ring portion, said wings being relatively thin in the circumferential direction and each being adapted to deflect laterally generally about a non-horizontal axis when in contact with said locking ring portion during threading of said closure onto the container.

39. A closure for a container having a threaded neck including an annular locking ring, comprising:

a plastic cap having a top wall portion, and an internally threaded, generally cylindrical skirt portion depending from said top wall portion, and a pilfer band depending from and connected to said skirt portion, said pilfer band including an annular band portion, and a plurality of circumferentially spaced projections extending integrally inwardly of said band portion, each of said projections being adapted to flex generally about a respective axis disposed at an acute angle to the axis of said closure, said projections being adapted to move toward said band portion so that said projections are movable past said locking ring during application of said closure to said container, said projections being dimensioned to engage said locking ring and the portion of said container neck adjacent said locking ring during removal of said closure from said container.

40. A closure in accordance with claim 39, wherein said skirt portion and said pilfer band are connected to each other by fracturable means including a plurality of fracturable bridges extending between said skirt portion and said pilfer band.

41. A closure in accordance with claim 39, wherein said pilfer band includes at least one area of relatively reduced strength adapted to fracture during removal of said closure from said container.

42. A tamper-indicating closure comprising:

a plastic cap having a top wall portion, and a generally cylindrical skirt portion depending from said top wall portion, and a pilfer band depending from said skirt portion, said pilfer band including an annular band portion, and a plurality of circumferentially spaced, relatively flexible projections extending integrally inwardly of said band portion, each of said projections being adapted to flex generally about a respective axis disposed at an actue angle to the axis of said closure.

43. A tamper-indicating closure in accordance with claim 42, and
fracturable means joining said pilfer band and said skirt portion comprising a plurality of frangible bridges.

44. A tamper-indicating closure in accordance with claim 42, wherein
each of said projections is relatively thin in a circumferential direction of said closure, and each includes a camming edge portion and a locking free end portion.

45. A tamper indicating closure in accordance with claim 42, and
fracturable means including a plurality of circumferentially spaced fracturable bridges extending between the internal surfaces of said skirt portion and said pilfer band, said skirt portion and said pilfer band being distinguished from each other by peripherally extending score line means.

46. A closure for a container having a threaded neck including an annular locking ring, comprising:
a plastic cap having a top wall portion, and an internally threaded, generally cylindrical skirt portion depending from said top wall portion, and
a pilfer band depending from said skirt portion and distinguished therefrom by fracturable means, said pilfer band including an annular band portion, and a plurality of circumferentially spaced, wing-like projections extending integrally inwardly of said band portion, each of said projections being adapted to flex generally about an edge portion integral with said band portion disposed at an acute angle to the axis of said closure, said projections being adapted to move toward said band portion so that said projections are movable past said locking ring during application of said closure to said container, said projections being dimensioned to engage said locking ring and the portion of said container neck adjacent said locking ring during removal of said closure from said container to fracture said fracturable means.

47. A closure in accordance with claim 46, wherein the edge portion of each said projection integral with said band portion is disposed at an angle in the range of approximately 20-60 degrees relative to the axis of said closure.

48. A closure in accordance with claim 47, wherein each of said projections extends non-radially inwardly of said band portion.

49. A closure in accordance with claim 46, wherein said fracturable means includes a plurality of circumferentially spaced fracturable bridges extending between the internal surfaces of said skirt portion and said band portion, said skirt portion and said band portion being distinguished from each other by peripheral score line means.

50. A closure in accordance with claim 49, including a connector portion joining said skirt portion and said band portion, said band portion including at least one fracturable area of relatively reduced strength which fractures during removal of said closure from said container so that said pilfer band remains connected to said skirt portion by said connector portion.

51. A closure in accordance with claim 46, wherein said pilfer band includes an annular shoulder extending inwardly of said band portion a distance at least equal to the thickness of said projections to accommodate movement of said projections toward said band portion.

52. A plastic closure, comprising:
a cap having a top wall portion, and a generally cylindrical skirt portion depending from said top wall portion, and
a pilfer band depending from said skirt portion and at least partially detachably joined thereto by a fracturable means,
said fracturable means including a plurality of spaced frangible bridges extending between the inside surfaces of said skirt portion and said pilfer band, said skirt portion and said pilfer band being distinguished from each other by score line means extending peripherally about at least a portion of said closure.

53. A closure in accordance with claim 52, wherein said pilfer band includes a plurality of relatively flexible, inwardly extending projections.

54. A plastic closure, comprising:
a cap having a top wall portion, a generally cylindrical skirt portion depending from said top wall portion, and a pilfer band depending from said skirt portion,
said pilfer band being at least partially detachably connected to said skirt portion by a plurality of circumferentially spaced, frangible bridges extending from one of the inwardly facing and outwardly facing surfaces of said pilfer band to said skirt portion, said skirt portion and said pilfer band being distinguished from each other by peripheral score line means extending about at least a portion of said closure, said score line means extending from the other of the inwardly and outwardly facing surfaces of said pilfer band.

55. A closure for a container having a neck including a locking ring portion, comprising:
a cap having a top wall portion and a skirt portion depending integrally therefrom, and
pilfer band means joined to said skirt portion,
said pilfer band means including a plurality of inwardly extending wing means, said wing means being adapted to move past said locking ring portion during application of said closure to said container, and to engage said locking ring portion during removal of said closure from said container whereby said pilfer band means resists removal of said closure from said container, each said wing means being movable generally about an axis which is non-perpendicular to the axis of said closure,
each of said wing means including a camming edge portion adapted to engage said locking ring portion during relative axial displacement of said closure relative to said container whereby said wing means are urged outwardly of said container and said pilfer band means fracture,
each of said wing means being disposed at an acute angle relative to the axis of said closure whereby said wing means are adapted to flex outwardly of said container during application of said closure to said container, said wing means generally resuming their configuration prior to application after said wing means are moved past said locking ring portion during application.

56. A closure for a container having a neck including a locking ring portion, comprising:
- a cap having a top wall portion and a skirt portion depending integrally therefrom, and
- pilfer band means joined to said skirt portion,
- said pilfer band means including a plurality of inwardly extending wing means, said wing means being adapted to move past said locking ring portion during application of said closure to said container, and to engage said locking ring portion during removal of said closure from said container whereby said pilfer band means resists removal of said closure from said container, each said wing means being movable generally about an axis which is non-perpendicular to the axis of said closure,
- said wing means each including an edge portion adapted to frictionally engage said locking ring portion during axial displacement of said closure relative to said container whereby said pilfer band means resists rotation of said closure relative to said container,
- each of said wing means being disposed at an acute angle relative to the axis of said closure whereby said wing means are adapted to flex outwardly of said container during application of said closure to the container, said wing means generally resuming their configuration prior to application after said wing means are moved past said locking ring portion during application.

57. A closure for a container having a neck including a locking ring portion, comprising:
- a cap having a top wall portion and a skirt portion depending integrally therefrom, and
- pilfer band means joined to said skirt portion,
- said pilfer band means including a plurality of inwardly extending wing means, said wing means being adapted to move past said locking ring portion during application of said closure to said container, and to engage said locking ring portion during removal of said closure from said container whereby said pilfer band means resists removal of said closure from said container, each said wing means being movable generally about an axis which is non-perpendicular to the axis of said closure,
- said wing means each including an edge portion adapted to engage and cam against said locking ring portion during axial displacement of said closure relative to said container whereby a free end portion of each of said wing means is urged into engagement with a portion of said container neck disposed adjacent said locking ring portion whereby said pilfer band means resists removal of said closure from said container,
- each of said wing means being disposed at an acute angle relative to the axis of said closure whereby said wing means are adapted to flex outwardly of said container during application of said closure to said container, said wing means generally resuming their configuration prior to application after said wing means are moved past said locking ring portion during application.

* * * * *